(12) United States Patent
Asano et al.

(10) Patent No.: US 7,323,126 B2
(45) Date of Patent: Jan. 29, 2008

(54) METHOD FOR FORMING A FOAMED PRODUCT INTEGRAL WITH A SHEET OF COVERING MATERIAL

(75) Inventors: Yasushi Asano, Tochigi (JP); Takahito Yabe, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 357 days.

(21) Appl. No.: 11/075,007

(22) Filed: Mar. 8, 2005

(65) Prior Publication Data

US 2005/0206027 A1    Sep. 22, 2005

(30) Foreign Application Priority Data

Mar. 8, 2004    (JP) .............................. 2004-064617

(51) Int. Cl.
    B29C 44/06    (2006.01)
(52) U.S. Cl. .................... 264/40.3; 264/46.4; 264/46.6; 264/46.8
(58) Field of Classification Search ............... 264/40.3, 264/46.4, 46.6, 46.8
    See application file for complete search history.

(56) References Cited

U.S. PATENT DOCUMENTS

| | | | | |
|---|---|---|---|---|
| 4,002,520 A | * | 1/1977 | Fenton | 156/246 |
| 4,025,372 A | * | 5/1977 | Fenton | 156/79 |
| 4,923,653 A | * | 5/1990 | Matsuura et al. | 264/46.6 |
| 4,976,414 A | * | 12/1990 | Yanagishita | 264/40.3 |
| 5,114,639 A | * | 5/1992 | Kurz et al. | 264/46.6 |

* cited by examiner

Primary Examiner—Allan R. Kuhns
(74) Attorney, Agent, or Firm—Dann, Dorfman, Herrell and Skillman, P.C.

(57) ABSTRACT

A method for forming a foamed product integral with a sheet of covering material utilizing a forming apparatus which comprises a first die, a second die housed within the first die and having air-ventilating holes, and a third die adapted to be combined with the first die, to thereby provide a forming cavity between the second die and the third die, the method comprising the steps of preparing a three-dimensional, air-permeable trim cover having a two layer structure comprising a layer of foamed material and a sheet of covering material laminated with the foamed material layer, putting the trim cover on the second die such that the sheet of covering material is facing the second die, applying vacuum to the trim cover through the air-ventilating holes of the second die to draw the trim cover onto the second die, causing the third die to be combined with the first die to define the forming cavity in cooperation with the first die, thereafter stopping the applying of the vacuum to the trim cover, and pouring expandable resins into the forming cavity and causing the expandable resins to foam to thereby form a cushioned padding integral with the trim cover, while applying compressed-air to the first die as pressure within the forming cavity rises due to gas generated by the foaming of the resins, the compressed-air balancing the gas in pressure.

3 Claims, 2 Drawing Sheets

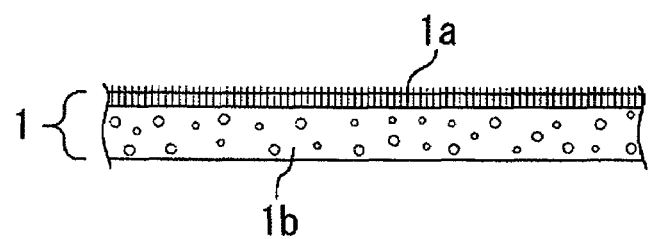
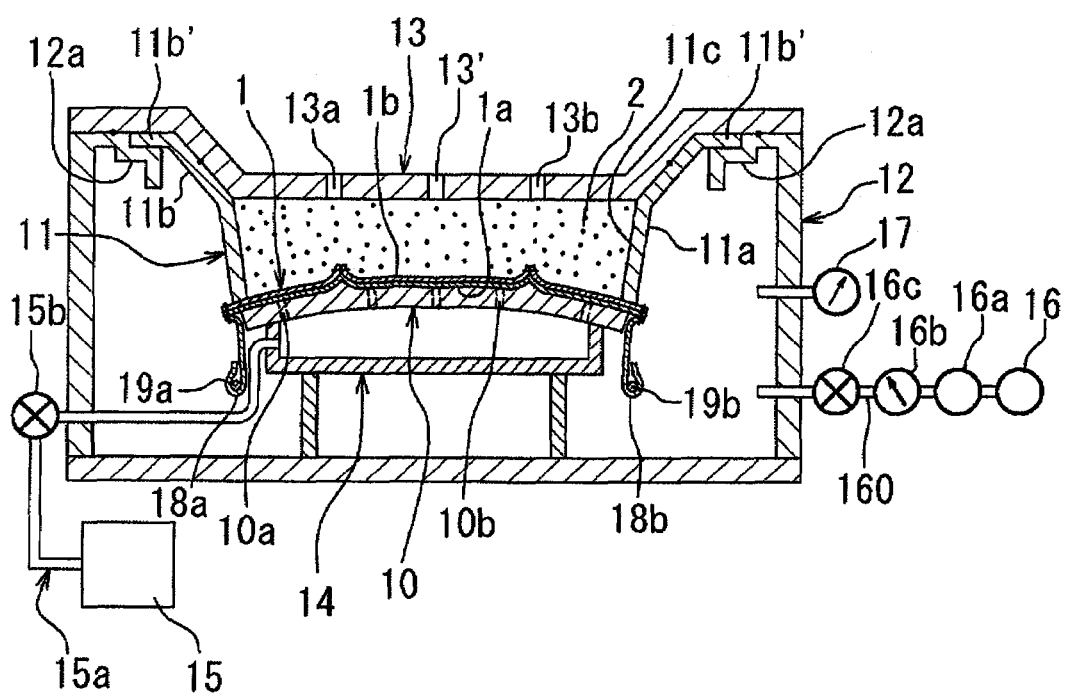

METHOD FOR FORMING A FOAMED PRODUCT INTEGRAL WITH A SHEET OF COVERING MATERIAL

BACKGROUND OF THE INVENTION

1. Field of the Invention

This invention relates to a process for forming a foamed product, e.g., a cushion for a seat cushion of a vehicle seat, a cushion for a seat back of the vehicle seat and the like, in which a cushioned padding formed of foamed resins is integrated with a trim cover.

2. Description of the Prior Art

In general, a foamed product integral with a sheet of covering material is made by causing a three dimensional trim cover to be supported on a lower die, causing an upper die to be combined with the lower die in such a manner to clamp the upper die against the lower die, pouring expandable resins into a forming cavity within the lower die through a pouring hole of the upper die, and causing the expandable resins to foam in the forming cavity, to thereby produce a cushioned padding made of the foamed resins and integrated with the trim cover.

Another method for forming a foamed product integral with a sheet of covering material is performed utilizing an apparatus which comprises an outer frame die, a vacuum applying box housed within the outer frame die, a supporting die arranged on the vacuum applying box and having air-ventilating holes, and an upper die having a pouring hole for allowing expandable resins to be poured into a forming cavity within the outer frame die therethrough. The vacuum applying box is coupled to air-absorbing means for applying suction or vacuum to the vacuum applying box. When a trim cover is put on the supporting die, suction or vacuum from the air-absorbing means is applied to the vacuum applying box and then applied to the trim cover put on the supporting die through the air-ventilating holes of the supporting die, resulting in the trim cover being drawn onto the supporting die and being positively set on the supporting die.

In order to form a foamed product integral with a sheet of covering material, which has a good touch and ensures a comfortable sitting feeling, an air-permeable, three dimensional trim cover which has a two-layer structure comprising a layer of foamed material and a sheet of covering material laminated with the foamed material layer is employed.

In a condition where the air-permeable trim cover is placed on the trim cover supporting die and is drawn onto the supporting die by the applying of vacuum to the trim cover put on the supporting die, when expandable resins are poured into the forming cavity within the outer frame die and then start to foaming, gas is generated due to the foaming of the expandable resins and pressure within the forming cavity is then increased by the gas and becomes higher than a pressure within the outer frame die. As a result, the foamed resins are excessively impregnated into the foamed material layer of the trim cover.

In order to prevent the foamed resins from being excessively impregnated into the foamed material layer of the trim cover, there is proposed a trim cover which has a thin layer of skin applied onto a foamed material layer of the trim cover (Japanese Utility Model Publication No. Hei. 5-44099).

However, even if the trim cover having the thin layer applied onto the foamed material layer is employed and a cushion for a seat is made as a foamed product by the above forming apparatus, foamed resins within the forming cavity of the apparatus are excessively impregnated into the foamed material layer, resulting in the foamed product having a poor touch and a poor sitting feeling.

SUMMARY OF THE INVENTION

The present invention has been made with a view to overcoming the foregoing problem of the prior art method.

It is therefore an object of the present invention to provide a method for forming a foamed product integral with a sheet of covering material which is capable of making a foamed product which has a good touch and an excellent sitting feeling.

In accordance with the present invention, there is provided a method for forming a foamed product integral with a sheet of covering material. The forming method is performed utilizing a forming apparatus which comprises a first die, a second die housed within the first die and having air-ventilating holes, and a third die adapted to be combined with the first die, to thereby provide a forming cavity between the second die and the third die. The forming method comprises the steps of preparing a three-dimensional, air-permeable trim cover having a two layer structure comprising a layer of foamed material and a sheet of covering material laminated with the foamed material layer, putting the trim cover on the second die such that the sheet of covering material is facing the second die, applying vacuum to the trim cover through the air-ventilating holes of the second die to draw the trim cover onto the second die, causing the third die to be combined with the first die to define the forming cavity in cooperation with the first die, thereafter stopping the applying of the vacuum to the trim cover, and pouring expandable resins into the forming cavity and causing the expandable resins to foam to thereby form a cushioned padding integral with the trim cover, while applying compressed-air to the first die as pressure within the forming cavity rises due to gas generated by the foaming of the resins, the compressed-air balancing the gas in pressure.

The foamed product may comprise a cushion for a vehicle seat, and a cushion for furniture.

The forming method according to the present invention includes the step of pouring expandable resins into the forming cavity and causing the expandable resins to foam to thereby form a cushioned padding integral with the trim cover, while applying the compressed-air balancing the gas in pressure to the first die as the pressure within the forming cavity rises due to the gas. Therefore, the degree to which a portion of the foamed resins is impregnated into the layer of foamed material of the trim cover is suppressed, whereby a foamed product has a good touch and ensures an excellent sitting feeling. Further, the degree to which the portion of the foamed resins is impregnated into the layer of the trim cover is suppressed, so that a thickness of the cushioned padding 2 is kept so as to have a thickness suitable for the cushioned padding of the cushion for the vehicle seat. Therefore, it is possible to provide the cushion which has a high compressive strength and an excellent cushioning property.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like designators denote the same parts throughout the Figures and wherein;

FIG. 1 is a schematic fragmentary view of a trim cover used in a method for forming a foamed product integral with a sheet of covering material according to the present invention;

FIG. 2 is a schematic sectional view showing an apparatus for performing the method;

DETAILED DESCRIPTION OF THE PREFERRED EMBODIMENT

Figure 3:
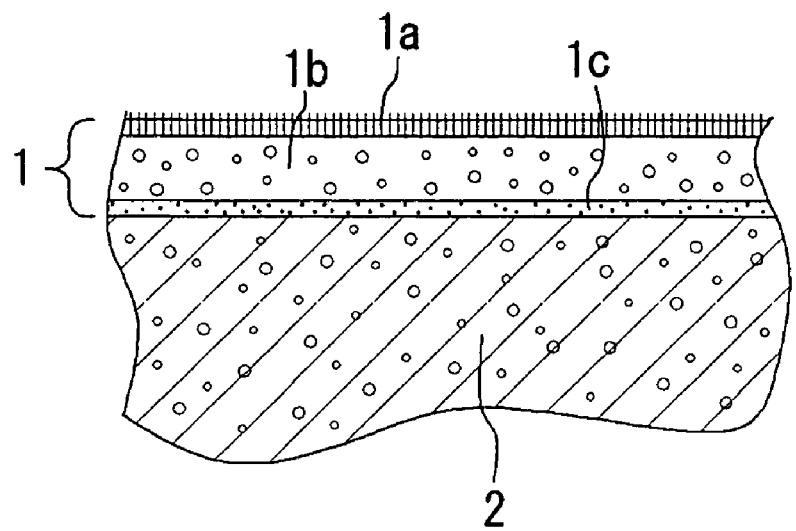
FIG. 3 is a schematic fragmentary sectional view of the foamed product.

Referring to FIG. 1, there is illustrated a trim cover 1 of a two-layer structure for a seat cushion of a vehicle seat, which is to be used in a forming method according to the present invention. The trim cover 1 comprises an air-permeable sheet 1a of covering material which is laminated with a layer 1b of foamed material. As the sheet 1a of covering material, there may be employed an air-permeable sheet of fabric, synthetic leather or the like which has permeable pores. As the layer 1b of foamed material, there may be employed a foamed slab which has a low-permeability of $0 < $ air-permeating quantity $\leq 1$ cc/cm$^2$/sec and a thickness of about 3-4 mm.

Referring to FIG. 2, there is illustrated a forming apparatus which may be employed for producing, for example, a cushion for a seat cushion of a vehicle seat as a foamed product integral with a sheet of covering material. The forming apparatus comprises a substantially box-like outer frame die 12 having an opening at an upper section thereof, a vacuum applying box 14 housed within the outer frame die 12 for applying vacuum or suction to the trim cover 1, the vacuum applying box 14 having an opening at an upper section thereof, a trim cover supporting die 10 for supporting the trim cover 1, the trim cover supporting die 10 being housed within the outer frame die 12 and arranged on the opened upper section of the vacuum applying box 14 so as to seal the vacuum applying box 14, the trim cover supporting die 10 having ventilating holes 10a, 10b formed in a surface thereof, a core 11 for defining a cavity 11c in cooperation with the trim cover supporting die 10 and an upper die 13, the cavity 11c serving as means to form a cushioned padding 2 of the cushion of the seat cushion, the core 11 being housed within the outer die 12 and detachably supported to the outer frame die 12 so as to be arranged above the trim cover supporting die 10, and the upper die 13 being adapted to be clamped against the outer frame die 12.

The forming apparatus further includes an air-absorbing means 15 which serves as means to apply suction or vacuum to the vacuum applying box 14. The air-absorbing means 15 is arranged outside the outer frame die 12 and connected through a vacuum applying path 15a to the vacuum applying box 14. A valve cock 15b is provided at the vacuum applying path 15a for opening and closing the vacuum applying path 15a.

In the illustrated example, the outer frame die 12 has an inward extending, circumferential stepped flange portion 12a surrounding the upper opening of the outer die 12. The outer frame die 12 further has spaced apart wires 19a, 19b provided therein. When the foamed product integral with a sheet of covering material is to be formed by the forming apparatus, hanging hooks 18a, 18b of the trim cover 1 supported on the trim cover supporting die 10 are hung on the wires 19a, 19b.

The core 11 is formed into a substantially cylindrical shape and comprises a reduced diameter section 11a, and a gradually increased diameter section 11b extending upwardly from the reduced diameter section 11a. The gradually increased diameter section 11b of the core 11 is provided at an upper end thereof with an outwardly horizontally extending, circumferential flange portion 11b'. The core 11 is adapted to be housed in the outer frame die 12 through the upper opening of the outer frame die 12 with the flange portion 11b' being engaged with the stepped flange portion 12a. Thus, the core 11 is detachably supported to the outer die 12.

The upper die 13 has a body of a substantially inverted Ohm-symbol in cross-section, and is arranged and supported on the outer frame die 12 with a central section thereof being received in the increased diameter section 11b of the core 11 so as to seal the reduced diameter section 11b of the core 11. The upper die 13 is formed with an expandable resin-pouring hole 13' for allowing expandable resins for the cushioned padding 2 to be poured into the cavity 11c defined between the upper die 13 and a lower die including the trim cover supporting die 10 and the core 11, and gas-ventilating holes 13a, 13b.

The forming apparatus further includes an air supplying source 16 for supplying compressed-air to the outer frame die 13. The air supplying source 16 is arranged outside the outer frame die 12. The air supplying source 16 is coupled through an air flowing path 160 to the outer frame die 12. A regulator 16a, a first air-pressure gauge 16b for measuring a pressure of air supplied from the air supplying source 16, and a valve 16c for opening and closing the air-flowing path 160 are provided at the air-flowing path 160. Further, a second air-pressure gauge 17 for measuring an air-pressure within the outer frame die 12 is provided at the outer frame die 12.

Seals which are indicated in FIG. 2 by dots are provided between first regions of the upper die 13 and the circumferential stepped flange portion 12a of the outer frame die 12, and between second regions of the upper die 13 and the gradually increased diameter section 11b of the core 11.

A method for producing a foamed product integral with a sheet of covering material, which is performed using the forming apparatus of FIG. 2 will be discussed hereinafter.

In a condition where the upper die 13 and the core 11 are removed from the outer frame die 12, the trim cover 1 is initially carried and provisionally positioned on the trim cover supporting die 10 with the sheet 1a of covering material facing the trim cover supporting die 10 and with the hanging hooks 18a, 18b of the trim cover 1 being hung on the wires 19a, 19b of the outer frame die 12. In this condition, vacuum or suction is applied through the vacuum applying path 15a to the vacuum applying box 14 by the air-absorbing means 15, whereby the vacuum or suction is applied to the trim cover 1 through the ventilating holes 10a, 10b of the trim cover supporting die 10, so that the trim cover 1 is drawn onto the trim cover supporting die 10 by the suction and set on the trim cover supporting die 10.

The core 11 is then combined with the outer frame die 12 in such a manner that a peripheral portion of the trim cover 1 is interposed between a peripheral portion of the core 11 and the trim cover supporting die 10. The upper die 13 is then supported and clamped against the opened upper section of the outer frame die 12. The temperature within the cavity 11c is set so as to be maintained at a temperature of about 55-60° C. in order to facilitate foaming of expandable resins to be poured into the cavity 11c between the upper die 13 and the lower die. Incidentally, in the event that a foamed slab having a thickness of about 3 mm is employed as the layer 1b, the core 11 is preferably combined with the outer frame die 13 in such a manner that a clearance of about 1.0 mm is kept between the core 11 and the layer 1b of the trim cover 1 supported on the trim cover supporting die 10.

After the core 11 and the upper die 13 are combined with the outer frame die 12 and before the expandable resins are poured into the cavity 11c through the pouring hole 13' of the upper die 13, the valve cock 15b is closed, to thereby stop the applying of suction to the vacuum applying box 14. The expandable resins such as expandable urethane resins are then poured into the cavity 11c between the lower die and the upper die 13 through the pouring hole 13' of the upper die 13. After the pouring of the expandable resins into the cavity 11c is completed, the pouring hole 13' and the gas-ventilating holes 13a, 13b are closed by any suitable covering means, whereby the outer frame die 12 is kept in a hermetically sealed condition.

The expandable resins poured into the cavity 11c start to foaming after seconds pass, and gas is generated in the cavity 11c by the foaming of the expandable resins. As a result, pressure in the cavity 11c starts to rising. Therefore, just after the cavity is hermetically sealed by the covering means, air pressure which balances the gas pressure in the cavity 11c is applied to the outer frame die 12 by supplying compressed-air to the outer frame die 12 from the air-supplying source 16, thereby preventing the gas from flowing from the cavity 11c into the outer frame die 12. Thus, the degree to which the foamed resins are impregnated into the layer 1b of foamed material can be suppressed.

By carrying out the foaming in such a manner as discussed above, a foamed product in which a portion 1c of the foamed resins is moderately impregnated into the layer 1b of foamed material and a cushioned padding 2 formed of the foamed resins is integrated with the sheet 1a of covering material through the layer 1b of foamed material as shown in FIG. 3 is produced. In the event that the layer 1b of the trim cover 1 is formed of a foamed slab which has a low-permeability of 0<air-permeating quantity≦1 cc/cm$^2$/sec and a thickness of about 3-4 mm, the portion 1c of the foamed resins which is impregnated into the layer 1b of foamed material has a thickness of about 0.6-1.2 mm.

The degree to which the portion of the foamed resins is impregnated into the layer 1b of the trim cover 1 in the finished cushion for the vehicle seat is suppressed as described above, so that a hardness of a surface of the finished cushion is lowered. Thus, the cushion which has a good touch and ensures an excellent sitting feeling can be provided. Further, the degree to which the portion of the foamed resins is impregnated into the layer 1b of the trim cover is suppressed, so that a thickness of the cushioned padding 2 is kept so as to have a thickness suitable for the cushioned padding of the cushion for the vehicle seat.

Therefore, it is possible to provide the cushion which has a high compressive strength and an excellent cushioning property.

EXAMPLE

Figure 4:
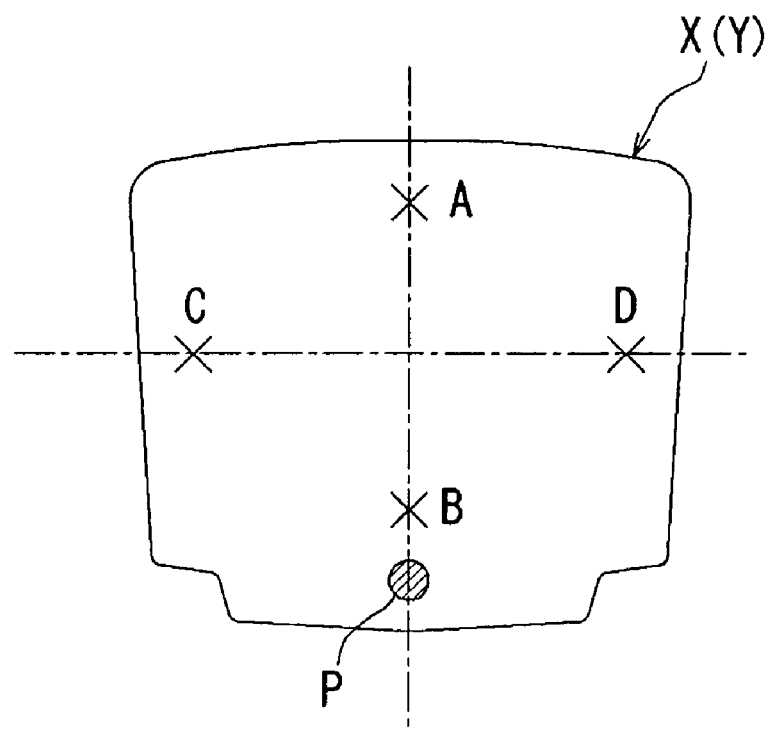
FIG. 4 is a schematic plan view which is of assistance in explaining measuring of the impregnation rate of foamed resins into a foamed material layer of the trim cover for the foamed product of the present invention and a comparative Example.

In order to demonstrate the properties provided by a cushion which is produced by the forming method according to the present invention, an Example X of the cushion of the present invention was produced, provided that a trim cover was prepared by laminating a sheet of covering material on a layer of a foamed slab having a low-permeability of 0<air-permeating quantity≦1 cc/cm$^2$/sec and a thickness of about 3 mm, amounts of expandable urethane resins to be supplied were 1,350 g, and the forming apparatus of FIG. 2 was employed. For a comparison purpose, a comparative cushion Y was produced under the same conditions except that any compressed-air is not supplied to the outer frame die. The Examples X (Y) are shown in FIG. 4.

When the expandable urethane resins were poured into the cavity 11c between the lower die and the upper die in order to form the Example X of the cushion of the present invention, the expandable urethane resins started gelling in seconds. Therefore, a compressed-air was supplied to the outer frame die in about 12 seconds from the pouring of the expandable urethane resins, thereby to keep a pressure in the outer frame die at a pressure of 0.03 MPa.

The compressive strength of the Examples X, Y (25% compressive strength), the rate of foamed urethane resin-impregnation in the layer 1b of the trim covers of the Examples X, Y (impregnation rate) and the hardness of surfaces of the Examples X, Y (surface hardness) are shown in the following Table.

TABLE

| Example | 25% Compressive Strength (kgf/200 φ) | Impregnation Rate | | | | Surface Hardness (N) | | | |
| --- | --- | --- | --- | --- | --- | --- | --- | --- | --- |
| | | A | B | C | D | A | B | C | D |
| Y | 25 | 27 | 43 | 37 | 33 | 27.1 | 27.7 | 30.8 | 28.2 |
| X | 28 | 20 | 23 | 33 | 33 | 22.9 | 22.6 | 25.8 | 25.5 |

The compressive strength was measured under a compressive pressure condition of 25%. The impregnation rate was determined at points A, B, C, D of the Examples X, Y shown in FIG. 4, on the basis of a pouring position of the expandable urethane resins. In order to measure the surface hardness, a repulsing force-measuring means having a hemispherical portion with a diameter of 20 mm was used. More particularly, the surface hardness was determined by pushing the hemispherical portion of the measuring means against the points A, B, C, D of the Examples X, Y and measuring repulsing forces of the hemispherical portion of the measuring means at the points A, B, C, D. The data in Table clearly show the high compressive strength, the suitable impregnation rate, and the suitable surface hardness of the Example X compared to the Example Y.

While the above description is made of the process for forming a cushion for a vehicle seat, this invention may be applied to a method for forming vehicle parts such as a cushion for a seat back of a vehicle seat, a cushion for a head rest of the vehicle seat, and a cushion for an arm rest of the vehicle seat, and a process for forming a foamed product integral with a sheet of covering material, for example, a cushion for furniture.

The terms and expressions which have been employed herein are used as terms of description and not limitation, and there is no intention in the use of such terms and expressions of excluding any equivalents of the features shown and described, or any portions thereof, but it is recognized that various modifications are possible within the scope of the invention claimed.

What is claimed is:

1. A method for forming a foamed product integral with a three-dimensional, air-permeable trim cover utilizing a forming apparatus which comprises a first die, a second die housed within said first die and having air-ventilating holes, a core disposed within said first die, and a third die having an expandable resin pouring-hole and adapted to be combined with said first die, to thereby provide a forming cavity between said second die and said third die, said method comprising the steps of:
  a. preparing said three-dimensional, air-permeable trim cover, said trim cover having a two layer structure comprising a layer of foamed material and a sheet of covering material laminated with said foamed material layer;
  b. putting said trim cover on said second die such that said sheet of covering material faces said second die;
  c. applying vacuum to said trim cover through said air-ventilating holes of the second die, to thereby cause said trim cover to be drawn onto said second die;
  d. causing said third die to be combined with said first die to define said forming cavity in cooperation with said first die;
  e. thereafter stopping the applying of said vacuum to said trim cover;
  f. pouring an expandable resin into said forming cavity through said expandable resin-pouring hole of said third die and causing said expandable resin to foam up;
  g. closing said expandable resin-pouring hole, to thereby cause an interior of said first die to be kept in a hermetically sealed condition; and
  h. applying compressed-air to an annular space between said first die and said core in order that an inner pressure within said annular space is balanced with a gas pressure occurring within said forming cavity due to the foaming of said expandable resin, whereby a foamed product integral with said trim cover is produced, in which the degree to which the foamed resin is impregnated into said layer of foamed material is suppressed.

2. A method according to claim 1, wherein said foamed product comprises a cushion for a vehicle seat, and a cushion for furniture.

3. A method according to claim 1 or 2, said method further including the step of measuring an air-pressure within said first die.

* * * * *